United States Patent Office 3,032,555
Patented May 1, 1962

3,032,555
DICHLOROACETANILIDE ESTERS AND THE MANUFACTURE THEREOF
Peter Oxley, Gerald Woolfe, Norman W. Bristow, James Fraser, George A. H. Williams, and Eric C. Wilmshurst, all of Nottingham, England, assignors to Boots Pure Drug Company Limited, Nottingham, England, a British company
No Drawing. Filed Sept. 18, 1958, Ser. No. 761,686
Claims priority, application Great Britain Nov. 3, 1955
5 Claims. (Cl. 260—268)

The invention relates to new derivatives of acetanilide.
The invention consists in compounds having the general formula:

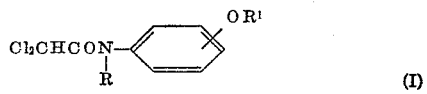

(I)

wherein R represents a lower alkyl radical and $R^1$ represents an $HOSO_2$-group; and $(HO)_2PO$-group; a

group wherein $R^2$ represents alkyl, alkenyl, aryl, aralkyl, aralkenyl, a cycloaliphatic group or the group —$R^3COOR^4$ wherein $R^3$ represents an alkylene, arylene or a cyclohexylene group and $R^4$ represents the [dichloroacet-N-(lower alkyl)-amido]phenyl radical; or a

wherein X represents oxygen or sulphur and $R^4$ is as above defined. Compounds of the above general Formula I have been found to possess valuable properties as amoebicides. The invention also consists in simple substituted products of the compounds of the above general Formula I containing for example one or more substituent groups such as halo, nitro, alkyl and alkoxy in the radicals represented by $R^2$ and $R^3$. Compounds of the above general Formula I wherein $R^1$ represents an $HOSO_2$-group or an $(HO)_2PO$-group form simple salts for example with alkali metal bases, alkaline earth metal bases, ammonium hydroxide and amines, and such salts are included in the present invention.

The amine salts include the salts with primary and secondary amines and a particular valuable class of salts is that produced from chloroquine viz. [7-chloro-4-(4¹-diethylamino-1¹-methylbutylamino)-quinoline] which itself possesses amoebicidal properties.

The compounds of the invention may be prepared by methods well known in the art for the preparation of esters of phenols.

Compounds of the general Formula I wherein $R^1$ represent $HOSO_2$— may be prepared from the corresponding phenols of the general formula:

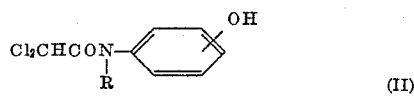

(II)

in which R is as hereinbefore defined by methods well known in the art for preparing inorganic esters of phenols. Thus these compounds may be prepared by reaction of a phenol of Formula II with sulphur trioxide and pyridine. Alternatively a phenol of Formula II may be reacted with sulphamic acid and pyridine in a reaction the overall results of which may be represented by the equation given below, in which R is as hereinbefore defined.

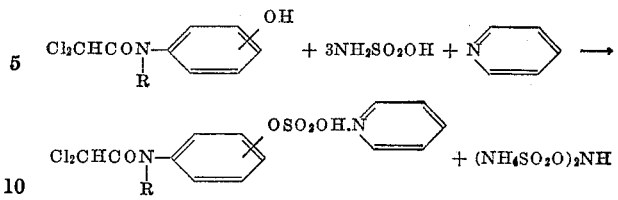

The compounds are obtained in the form of their salts with pyridine and may be converted to salts with other organic or inorganic bases by appropriate methods.

Compounds of the general Formula I wherein $R^1$ represents $(HO)_2PO$— may be prepared by the interaction of a phenol of the general Formula II and phosphorus oxychloride in the presence of pyridine followed by hydrolysis for example by treatment of the chlorophosphate so obtained with water.

Compounds of the general Formua I wherein $R^1$ represents the group —$CO.R^2$ in which $R^2$ is alkyl, alkenyl, aryl, aralkyl, aralkenyl, or a cycloaliphatic group may be prepared by the interaction of a compound of the general Formula II and an acid halide of the general formula $R^2CO.Y$ in which $R^2$ is alkyl, alkenyl, aryl, aralkyl, aralkenyl, or a cycloaliphatic group and Y is a halogen atom in the presence of an acid binding agent.

When $R^2$ represents the group —$R^3CO.OR^4$ the acid halide employed in the reaction is of the general formula $R^3(COY)_2$ in which $R^3$ and Y are as hereinbefore defined.

Alternatively compounds of the general Formula I wherein $R^1$ represents the group —$CO.R^2$ in which $R^2$ is alkyl, alkenyl, aryl, aralkyl, aralkenyl, or a cycloaliphatic group may be prepared by interaction of a compound of the general Formula II and an acid anhydride of the general formula $(R_2CO)_2O$ in which $R_2$ is alkyl, alkenyl, aryl, aralkyl, aralkenyl, or a cycloaliphatic group.

A further alternative method of preparation is by the interaction of a compound of the general formula:

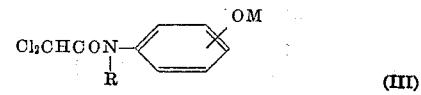

(III)

and an acid halide $R^2CO.Y$ in which R and Y are as hereinbefore defined and $R^2$ is alkyl, alkenyl, aryl, aralkyl, aralkenyl or a cycloaliphatic group and M represents an alkali metal.

When $R^2$ represents the group —$R^3COOR^4$ the acid halide is of the general formula $R^3(CO.Y)_2$ in which $R^3$ and Y are as hereinbefore defined.

Compounds of the general Formula I wherein $R^1$ represents the group —$COR^2$ in which $R^2$ is alkyl, alkenyl, aryl, aralkyl, aralkenyl or a cycloaliphatic group may be prepared by the interaction of a compound of the general formula:

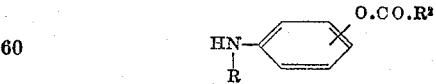

in which R is as defined above and $R^2$ is alkyl, alkenyl, aryl, aralkyl, aralkenyl or a cycloaliphatic group and dichloroacetyl chloride. The reaction may be carried out in the presence of an acid-binding agent.

Compounds of the general Formula I wherein $R^1$ represents a

group wherein $R^4$ and X are as hereinbefore defined are prepared by reaction of a phenol of Formula II with phosgene or thiophosgene.

The amoebicidal activity of the compounds of the present invention has been demonstrated in animals in the following manner. The technique is substantially that described by Jones (Annals of Tropical Medicine and Parasitology, 1946, 40, 130) in which newly weaned rats are inoculated intracaecally with trophozoites of *E. histolytica*. Starting on the day after inoculation 5 daily doses of the drug under test are administered by stomach tube to each of a group of rats and the animals are killed one day after the final dose. The caecum of each rat is examined both microscopically and macroscopically and the degree of infection of each rat is assessed on an arbitrary scale. The average degree of infection ("A.D.I.") is then calculated for each group. A compound is regarded as showing promising amoebicidal activity when the "A.D.I." of the treated group is less than half that of an undosed control group. With highly effective drugs the rats are completely cleared of amoebae and the "A.D.I." is then nought. In Table I below are set out the results obtained in the above test using the compounds of the present invention. Details are given of the daily dosage rates of the compound under test and of the "activity." The latter is the figure obtained by dividing the "A.D.I." obtained for the control group by the "A.D.I." for the drug treated group (each figure represents the result of one experiment). Thus a figure so obtained of greater than unity indicates that the compound under test shows amoebicidal activity; the greater this figure the greater is the activity and, in the case of a complete clearing of amoebae by the drug under test, the "activity" is recorded as "∞."

TABLE I

| Reference No. | Compound | Daily dose (mg./kg.) | Activity (A.D.I. of control) (A.D.I. of treated) |
|---|---|---|---|
| R.D. 4499 | Piperazinium 4-(dichloroacet-N-methylamido) phenyl sulphate. | 200<br>100<br>50<br>25 | 3.5.<br>4.6.<br>2.3, 4.0, 1.9.<br>1.5. |
| R.D. 4732 | 4-(dichloroacet-N-methylamido) phenyl crotonate. | 200<br>100<br>50<br>25 | 6.4.<br>5.3.<br>5.0.<br>4.5. |
| R.D. 4801 | 4-(dichloroacet-N-methylamido) phenyl propionate. | 100<br>50<br>25 | 3.8, 1.9.<br>3.8, 1.9.<br>2.2. |
| R.D. 4223 | Dichloroacet-4-dichloroacetoxy-N-methylanilide. | 200<br>100 | 5.0, 1.5.<br>0.8. |
| R.D. 4437 | Dichloroacet-4-acetoxy-N-methylanilide. | 200<br>100 | 2.0, 1.9, 2.7.<br>2.4. |
| R.D. 5217 | 4-(dichloroacet-N-methylamido) phenyl-phosphoric acid. | 200<br>100<br>50<br>25<br>12.5 | 4.0.<br>10.5.<br>3.5.<br>2.1.<br>1.9. |
| R.D. 5268 | Bis-benzylammonium 4-(dichloroacet-N-methylamido) phenyl phosphate. | 200<br>50 | ∞.<br>0.8. |
| R.D. 5269 | 7-chloro-4-(4'-diethylamino-1'-methylbutylamino) quinolinium bis [4-(dichloroacet-N-methylamido) phenyl phosphate]. | 200<br>50<br>12.5 | ∞.<br>2.8.<br>0.8. |
| R.D. 5514 | Piperazinium 4-(dichloroacet-N-methylamido) phenyl phosphate. | 200<br>50<br>12.5 | 10.0.<br>2.9.<br>1.8. |
| R.D. 5382 | Disodium 4-(dichloroacet-N-methylamido) phenyl phosphate. | 200<br>50<br>12.5 | ∞.<br>3.2.<br>1.1. |
| R.D. 5212 | 4-benzyloxy-N-dichloroacet-N-methylanilide. | 200<br>50<br>25<br>12.5<br>6.25 | ∞.<br>∞, 37.0.<br>6.1.<br>1.1, 2.0, 2.5.<br>2.3 (mean of 10 tests). |
| R.D. 5214 | 4-chloroacetoxy-N-dichloroacet-N-methylanilide. | 200<br>50<br>12.5 | ∞.<br>4.2.<br>1.4. |

TABLE I—Continued

| Reference No. | Compound | Daily dose (mg./kg.) | Activity (A.D.I. of control) (A.D.I. of treated) |
|---|---|---|---|
| R.D. 5215 | 4-alpha-chloropropionyloxy-N-dichloroacet-N-methylanilide. | 200<br>50<br>12.5 | 10.<br>5.2<br>1.1. |
| R.D. 5216 | 4-n-butyryloxy-N-dichloroacet-N-methylanilide. | 200<br>50<br>12.5 | ∞.<br>1.9.<br>1.4. |
| R.D. 5315 | Bis-[4-(dichloroacet-N-methylamido)-phenyl] carbonate. | 200<br>50<br>12.5 | 4.0.<br>3.5.<br>1.6. |
| R.D. 5383 | Bis [4-(dichloroacet-N-methylamido)-phenyl]thionocarbonate. | 200<br>50<br>12.5 | 3.3.<br>1.9.<br>0.9. |
| R.D. 6409 | 4-(dichloroacet-N-methylamido) phenyl laurate. | 200<br>100<br>50<br>25 | ∞.<br>3.2, 8.0.<br>2.0.<br>0.8. |
| R.D. 6465 | 4-(dichloroacet-N-methylamido) phenyl stearate. | 200<br>100<br>50<br>25<br>12.5 | 6.4.<br>3.2.<br>40.0.<br>2.2.<br>1.1. |
| R.D. 6466 | 4-(dichloroacet-N-methylamido) phenyl alpha-naphthoate. | 200<br>100 | 2.0.<br>1.4. |
| R.D. 6506 | 4-(dichloroacet-N-methylamido) phenyl diphenylacetate. | 200<br>100 | 2.8.<br>1.2. |
| R.D. 7091 | 4-(dichloroacet-N-methylamido) phenyl 4-chlorobenzoate. | 50<br>25<br>12.5 | 4.9.<br>2.3.<br>1.1. |
| R.D. 7153 | 4-(dichloroacet-N-methylamido) phenyl 4-methoxybenzoate. | 25<br>12.5<br>6.25 | 4.9.<br>2.0.<br>1.3. |
| R.D. 7155 | 4-(dichloroacet-N-methylamido) phenyl cinnamate. | 6.25 | 1.2. |
| R.D. 7157 | 4-(dichloroacet-N-methylamido) phenyl sebacate. | 25<br>12.5 | 5.2.<br>0.9. |
| R.D. 7180 | 4-(dichloroacet-N-methylamido)phenyl oleate. | 6.25 | 1.4. |
| R.D. 7229 | 4-(dichloroacet-N-methylamido)phenyl phthalate. | 6.25 | 0.9. |
| R.D. 7230 | 4-(dichloroacet-N-methylamido)phenyl 3-phenylpropionate. | 6.25 | 1.6. |
| R.D. 7231 | 4-(dichloroacet-N-methylamido)phenyl 2-acetylsalicylate. | 6.25 | 2.0. |
| R.D. 7232 | 4-(dichloroacet-N-methylamido)phenyl hexahydrobenzoate. | 6.25 | 2.0. |
| R.D. 7305 | 4-(dichloroacet-N-methylamido)phenyl terephthalate. | 6.25 | 1.1. |
| R.D. 7306 | 4-(dichloroacet-N-methylamido)phenyl 4-nitrobenzoate. | 6.25 | 2.8. |
| R.D. 7387 | 4-(dichloroacet-N-methylamido)phenyl p-toluate. | 6.25 | ∞ |
| R.D. 7388 | 4-(dichloroacet-N-methylamido)phenyl 2-chlorobenzoate. | 6.25 | 1.2. |
| R.D. 7389 | 4-(dichloroacet-N-methylamido)phenyl 4-methanesulphonyl benzoate. | 6.25 | 1.7. |
| R.D. 7390 | 4-(dichloroacet-N-methylamido)phenyl 3:4-dimethoxybenzoate. | 6.25 | 1.5. |
| R.D. 7392 | 4-(dichloroacet-N-methylamido)phenyl 2-benzoylbenzoate. | 6.25 | 0.8. |
| R.D. 7432 | 4-(dichloroacet-N-methylamido)phenyl 3-methoxybenzoate. | 6.25 | 1.3. |
| R.D. 7436 | 4-(dichloroacet-N-methylamido)phenyl hippurate. | 6.25 | 0.65. |
| R.D. 7437 | 4-(dichloroacet-N-methylamido)phenyl octanoate. | 6.25 | 0.8. |
| R.D. 7537 | 4-(dichloroacet-N-methylamido)phenyl O-methylmandelate. | 6.25 | 1.5. |
| R.D. 7571 | 4-(dichloroacet-N-methylamido)phenyl alpha-methoxypropionate. | 6.25 | 1.5. |

Compounds of the general Formula II and methods for their preparation are described in our co-pending application No. 523,110, now Patent Number 2,912,438.

The following non-limitative examples illustrate the invention.

*Example 1*

In the preparation of piperazinium 4-(dichloroacet-N-methylamido)phenyl sulphate a mixture of 7.02 grams of dichloroacet-4-hydroxy-N-methylanilide, 9.7 grams of sulphamic acid and 75 cc. of pyridine is stirred and heated to 95° C. on the steam bath for 15 minutes. At the end of this time the mixture is allowed to cool and the precipitate of ammonium imidodisulphonate so obtained is removed by filtration and washed with 25 cc. of pyridine. The combined filtrate and washings are evaporated to dryness in vacuo and the residual pyridine salt of 4-(dichloroacet-N-methylamido)phenyl sulphuric acid is dissolved in 50 cc. of isopropanol. To the solution so obtained is added 7 grams of piperazine hydrate. The crude piperazine salt which is precipitated is isolated by filtration and recrystallised from 100 cc. of ethanol. There is thus obtained piperazine 4-(dichloroacet-N-methylamido)phenyl sulphate in the form of a crystalline solid which has a melting point of 150–152° C. with decomposition. (Found: C, 39.1; H, 4.8; N, 10.6. $C_{13}H_{19}O_5N_3Cl_2S$ requires C, 39.0; H, 4.8; N, 10.5%.)

The preparation of dichloroacet-4-hydroxy-N-methylanilide which is employed in the above reaction is described in our co-pending application Ser. No. 523,110.

*Example 2*

In the preparation of 4-(dichloroacet-N-methylamido)-phenyl crotonate 11 grams of crotonyl chloride are added dropwise with stirring to a mixture of 23.4 grams of dichloroacet-4-hydroxy-N-methylanilide, 24.2 grams of dimethylaniline and 30 cc. of petroleum ether (boiling range 60–80° C.). The resulting mixture is stirred and maintained at approximately 50° C. for 5 hours. At the end of this time, the mixture is allowed to cool and 60 cc. of benzene and 55 cc. of 2 N hydrochloric acid are added and the precipitate of unchanged dichloroacet-4-hydroxy-N-methylanilide so obtained is removed by filtration. After allowing the filtrate to stand, the organic layer is separated and washed successively with 100 cc. of water and 100 cc. of saturated sodium carbonate solution, and is then dried over anhydrous magnesium sulphate. The solvent is removed by distillation and the solid so obtained is recrystallised from aqueous alcohol. There is thus obtained 4-(dichloroacet-N-methylamido)phenyl crotonate in the form of a crystalline solid which has a melting point of 103–104° C. (Found: N, 4.5. $C_{13}H_{13}O_3NCl_2$ requires N, 4.6%.)

*Example 3*

In the preparation of 4-(dichloroacet-N-methylamido)-phenyl propionate 19.4 grams of propionyl chloride are added dropwise with stirring to a mixture of 46.8 grams of dichloroacet-4-hydroxy-N-methylanilide, 17.4 grams of pyridine and 100 cc. of petroleum ether (boiling range 60–80° C.). The resulting mixture is stirred and maintained at 30–40° C. for 3 hours. At the end of this time the mixture is allowed to cool and 120 cc. of benzene and 120 cc. of 2 N hydrochloric acid are added. The organic layer is separated and washed successively with 100 cc. of water and 100 cc. of saturated sodium carbonate solution. After drying over anhydrous sodium sulphate, the solvent is removed by distillation and the solid so obtained is recrystallised twice from alcohol. There is thus obtained 4-(dichloroacet-N-methylamido)-phenyl propionate in the form of a crystalline solid which has a melting point of 81–81.5° C. (Found: N, 5.1. $C_{12}H_{13}O_3NCl_2$ requires N, 4,8%.)

*Example 4*

In the preparation of dichloroacet-4-dichloroacetoxy-N-methylanilide 5.6 grams of dichloroacetyl chloride are added with stirring to a suspension of 10 grams of the sodium derivative of dichloroacet-4-hydroxy-N-methylanilide in 50 cc. of toluene. The mixture so obtained is heated on the steam bath with stirring for 30 minutes. After allowing to cool the mixture is washed with 100 cc. of water followed by 100 cc. of 2 N sodium hydroxide solution and is dried over anhydrous sodium sulphate. The solvent is removed by distillation and the solid so obtained is recrystallised from alcohol. There is thus obtained dichloroacet-4-dichloroacetoxy-N-methylanilide in the form of a crystalline solid which has a melting point of 95.5–96.5° C. (Found: N, 4.2, $C_{11}H_9O_3NCl_4$ requires N, 4.1%.)

The sodium salt of dichloroacet-4-hydroxy-N-methylanilide employed in the above reaction is prepared in the following manner. 27.3 grams of a 28,68% w./w. solution of sodium methoxide in methanol is added to 36 grams of dichloroacet-4-hydroxy-N-methylanilide in 250 cc. of methanol. The solution so obtained is evaporated to dryness under reduced pressure. The required sodium salt is thus obtained and may be ground to give a cream coloured powder.

*Example 5*

In the preparation of dichloroacet-4-acetoxy-N-methylanilide 6.25 cc. of acetic anhydride are added to a mixture of 11.7 grams of dichloroacet-4-hydroxy-N-methylanilide, 30 cc. of water, 15 cc. of 5 N sodium hydroxide solution and 50 grams of ice. The resulting mixture is shaken vigorously and a pale brown gum separates and solidifies. The crude product is isolated by filtration and recrystallised from aqueous alcohol. There is thus obtained dichloroacet-4-acetoxy-N-methylanilide in the form of a crystalline solid which has a melting point of 89.5° C. (Found: C, 47.75; H, 4.2. $C_{11}H_{11}O_3NCl_2$ requires C, 47.9; N, 4.0%.)

*Example 6*

In the preparation of 4-benzoyloxy-N-dichloroacet-N-methylanilide a mixture of 11.7 grams of dichloroacet-4-hydroxy-N-methylanilide, 100 cc. of water, 12 cc. of 6 N sodium hydroxide solution, 8 grams of benzoyl chloride, and 50 milligrams of sodium sulphite is vigorously shaken at room temperature until reaction is complete. The resulting solid is isolated by filtration and recrystallised twice from alcohol. There is thus obtained 4-benzoyloxy-N-dichloroacet-N-methylanilide in the form of a crystalline solid which has a melting point of 114–117° C. (Found: N, 4.5. $C_{16}H_{13}O_3NCl_2$ requires N, 4.1%.)

*Example 7*

In the preparation of 4-chloroacetoxy-N-dichloroacet-N-methylanilide 17 grams of chloroacetyl chloride is slowly added to a stirred suspension of 23.4 grams of dichloroacet-4-hydroxy-N-methylanilide in 300 cc. of ether and 12.5 cc. of pyridine. The mixture so obtained is stirred at room temperature for 1 hour before the addition of 100 cc. of water. The ether layer is separated and washed with two portions of water, each of 100 cc. The second wash causes the product to crystallise out in the ether layer and it is isolated by filtration and recrystallised from alcohol. There is thus obtained 4-chloroacetoxy-N-dichloroacet-N-methylanilide in the form of a crystalline solid which has a melting point of 113° C. (Found: N, 4.8. $C_{11}H_{10}O_3NCl_3$ requires N, 4.5%.)

In exactly similar manner using alpha-chloropropionyl chloride in place of chloroacetyl chloride there is obtained 4-alpha-chloropropionyloxy-N-dichloroacet-N-methylanilide in the form of a crystalline solid which has a melting point of 69–71° C. (Found: N, 4.6. $C_{12}H_{12}O_3NCl_3$ requires N, 4.3%.)

*Example 8*

In the preparation of 4-n-butyryloxy-N-dichloroacet-N-methylanilide 23.7 grams of butyric anhydride is slowly added to a solution of 23.4 grams of dichloroacet-4-hydroxy-N-methylanilide in 100 cc. of pyridine. The solution so obtained is kept at 20° C. for 3 days and then poured into a large excess of water. The oil which separates crystallises slowly and is isolated by filtration and recrystallised from 70% alcohol. There is thus obtained 4-n-butyryloxy-N-dichloroacet-N-methylanilide in the form of a crystalline solid which has a melting point of 42–43° C. (Found: N, 4.6. $C_{13}H_{15}O_3NCl_2$ requires N, 4.6%.)

*Example 9*

In the preparation of 4-(dichloroacet-N-methylamido)phenylphosphoric acid a solution of 18.4 grams of phosphorus oxychloride in 40 cc. of dry ether is slowly added with stirring to a mixture of 23.4 grams of dichloroacet-4-hydroxy-N-methylanilide, 300 cc. of dry ether and 9.5 grams of dry pyridine at room temperature in a flask fitted with a reflux condenser. After addition is complete the mixture so obtained is stirred for 2.5 hours and 100 cc. of water is then added slowly with stirring, and the resulting mixture is stirred for a further hour. At the end of this time there is obtained a three phase mixture the oily phase of which solidifies on standing for about 15 hours. The solid so obtained is removed by filtration, washed with 25 cc. of ether and with 25 cc. of water and dried in vacuo. This crude product is recrystallised from a mixture of 12 cc. of acetone and 48 cc. chloroform. There is thus obtained 4-(dichloroacet-N-methylamido)phenylphosphoric acid monohydrate in the form of a crystalline solid which has a melting point of 119–121° C. (Found: $H_2O$, 5.25. $C_9H_{10}O_5NCl_2P.H_2O$ requires $H_2O$, 5.4%.) The monohydrate so obtained is dried at 100° C. to constant weight. There is thus obtained 4-(dichloroacet-N-methylamido)phenylphosphoric acid in the form of a crystalline solid which has a melting point of 137–139° C. (Found: C, 34.1; H, 3.6; N, 4.6. $C_9H_{10}O_5NCl_2P$ requires C, 34.4; H, 3.2; N, 4.5%.)

*Example 10*

In the preparation of monosodium 4-(dichloroacet-N-methylamido)phenyl phosphate 1.66 grams of 4-(dichloroacet-N-methylamido)phenylphosphoric acid monohydrate (prepared as described in Example 9) is dissolved in 5 cc. of N sodium hydroxide solution and the solution so obtained is evaporated to dryness at a temperature below 30° C., under a pressure of 15 mm. of mercury. The residue is dried over phosphorus pentoxide under a pressure of 5 mm. of mercury for two days and finally at 100° C. under a pressure of 2 mm. of mercury for 1.5 hours. There is thus obtained monosodium-4-(dichloroacet-N-methylamido)phenyl phosphate in the form of a solid which has a melting point of 167–169° C. (Found: N, 4.2. $C_9H_9O_5NCl_2PNa$ requires N, 4.2%.)

*Example 11*

In the preparation of diammonium-4-(dichloroacet-N-methylamido)phenyl phosphate 1.66 grams of 4-(dichloroacet-N-methylamido)phenylphosphoric acid monohydrate (prepared as described in Example 9) is dissolved in 2 cc. of ammonium hydroxide solution (specific gravity 0.88) and the solution so obtained is evaporated to dryness under a pressure of 15 mm. of mercury. The residue is dissolved in 2 cc. of water and 25 cc. of acetone is added to the resulting solution. The solid which is precipitated by this addition is isolated by filtration and recrystallised from aqueous acetone containing a small quantity of ammonium hydroxide solution. There is thus obtained diammonium 4-(dichloroacet-N-methylamido)phenyl phosphate in the form of a crystalline solid which has a melting point of 157–166° C. (Found N, 12.0. $C_9H_{16}C_5N_3Cl_2P$ requires N, 12.1%.)

*Example 12*

In the preparation of calcium 4-(dichloroacet-N-methylamido)phenyl phosphate 0.5 gram of calcium carbonate is added to a solution of 1.66 grams of 4-(dichloroacet-N-methylamido)phenylphosphoric acid monohydrate (prepared as described in Example 9) in 5 cc. of water. When the effervescence has subsided the mixture is filtered and allowed to crystallise at 0° C. There is thus obtained calcium 4-(dichloroacet-N-methylamido)phenyl phosphate in the form of a crystalline solid which does not melt below 310° C. (Found: N, 4.2.

$C_9H_8O_5NCl_2PCa$ requires N, 4.0%.)

*Example 13*

In the preparation of bisbenzylammonium 4-(dichloroacet-N-methylamido)phenyl phosphate a solution of 3.32 grams of 4-(dichloroacet-N-methylamido)phenylphosphoric acid monohydrate (prepared as described in Example 9) in 7 cc. of acetone is added to a solution of 2.14 grams of benzylamine in 20 cc. of water with stirring. The salt crystallises out and is collected by filtration after cooling the solution to 15° C. There is thus obtained bisbenzylammonium 4-(dichloroacet-N-methylamido)-phenyl phosphate in the form of a crystalline solid which has a melting point of 200–201° C. (Found: N, 8.3. $C_{23}H_{28}O_5N_3Cl_2P$ requires N, 8.0%.)

*Example 14*

In the preparation of 7-chloro-4-($4^1$-diethylamino-$1^1$-methylbutylamino)quinolinium 4-(dichloroacet-N-methylamido)phenyl phosphate 1.6 grams of 7-chloro-4-($4^1$-diethylamino-$1^1$-methylbutylamino)quinoline is added to a solution of 1.66 grams of 4-(dichloroacet-N-methylamido)phenylphosphoric acid monohydrate (prepared as described in Example 9) in 5 cc. of methanol. The solution so obtained is evaporated to half its original volume and the required salt is precipitated by the addition to the resulting solution of 25 cc. of acetone. The precipitate so obtained is washed with acetone and residual acetone is removed by subjecting the solid to a reduced pressure of 2 mm. of mercury. The solid is then dried for 1 hour at 100° C. There is thus obtained 7-chloro-4-($4^1$-diethylamino-$1^1$-methylbutylamino) quinolinium 4-(dichloroacet-N-methylamido)phenyl phosphate in the form of a solid. (Found: N, 9.1. $C_{27}H_{36}O_5N_4Cl_3P$ requires N, 8.8%.)

In exactly similar manner, using 0.8 gram of 7-chloro-4-($4^1$-diethylamino-$1^1$-methylbutylamino) quinoline, there is obtained 7-chloro-4-($4^1$-diethylamino-$1^1$-methylbutylamino)quinolinium bis [4-(dichloroacet-N-methylamido)-phenyl phosphate] in the form of a solid. (Found: N, 7.4. $C_{36}H_{46}O_{10}N_5Cl_5P_2$ requires N, 7.4%.)

*Example 15*

In the preparation of piperazinium 4-(dichloroacet-N-methylamido)phenyl phosphate 1.84 grams of piperazine hexahydrate is added to 3.32 grams of 4-(dichloroacet-N-methylamido)phenylphosphoric acid monohydrate (prepared as described in Example 9) in 20 cc. of isopropanol. A precipitate is immediately formed and the mixture is cooled in ice before the precipitate is isolated by filtration and recrystallised from water. There is thus obtained piperazinium 4-(dichloroacet-N-methylamido)phenyl phosphate in the form of a crystalline solid which has a melting point of 205–206° C. with decomposition. (Found: N, 10.4. $C_{13}H_{20}O_5N_3Cl_2P$ requires N, 10.5%.)

*Example 16*

In the preparation of anilinium 4-(dichloroacet-N-methylamido)phenyl phosphate a mixture of 0.83 gram of 4-(dichloroacet-N-methylamido)phenylphosphoric acid monohydrate (produced as described in Example 9) 0.23 gram of aniline and 5 cc. of water is heated to produce a solution, which on cooling yields a crystalline precipitate. This is isolated by filtration and dried at 80° C. There is thus obtained anilinium 4-(dichloroacet-N-methylamido)phenyl phosphate in the form of a crystalline solid which has a melting point of 122–126°

C. (Found: N, 6.7. $C_{15}H_{17}O_5N_2Cl_2P$ requires N, 6.9%.)

In exactly similar manner using 0.46 gram of aniline is prepared bisanilinium 4-(dichloroacet-N-methylamido)phenyl phosphate in the form of a crystalline solid which has a melting point of 145–148° C. (Found: N, 8.1. $C_{21}H_{24}O_5N_3Cl_2P$ requires N, 8.4%.)

Example 17

In the preparation of disodium 4-(dichloroacet-N-methylamido)phenyl phosphate 1.66 grams of 4-(dichloroacet - N - methylamido)phenylphosphoric acid monohydrate (prepared as described in Example 9) is dissolved in 10 cc. of N sodium hydroxide solution and the solution so obtained is evaporated to dryness under reduced pressure. The residue is crystallised from a mixture of 2 cc. of water and 5 cc. of acetone and dried at 100° C. There is thus obtained disodium 4-(dichloroacet-N-methylamido)phenyl phosphate in the form of a crystalline solid with no sharp melting point. (Found: N, 3.9; Na, 11.8. $C_9H_8O_5NCl_2PNa_2$ requires N, 3.9; Na, 12.8%.)

Example 18

In the preparation of bis-[4-(dichloroacet-N-methylamido)phenyl] carbonate a solution of 23.4 grams of dichloroacet-4-hydroxy-N-methylanilide in a mixture of 22 cc. of 5 N sodium hydroxide solution, 5 cc. of saturated sodium bisulphite solution and 200 cc. of water is stirred at room temperature and saturated with phosgene. A precipitate is formed, which is collected by filtration and ground with 100 cc. of N sodium hydroxide solution. The solid is collected and recrystallised from 15 cc. of Cellosolve, and again from 10 cc. of Cellosolve. There is thus obtained bis-[4-(dichloroacet-N-methylamido)phenyl] carbonate in the form of a crystalline solid which has a melting point of 164–165° C. (Found: C, 46.3; H, 3.5. $C_{19}H_{16}O_5N_2Cl_4$ requires C, 46.2; H, 3.2%.)

In exactly similar manner using thiophosgene in place of phosgene there is obtained bis-[4-(dichloroacet-N-methylamido)phenyl] thionocarbonate in the form of a crystalline solid which has a melting point of 174–177° C. (Found: C, 44.4; H, 3.2; N, 5.5. $C_{19}H_{16}O_4N_2Cl_4S$ requires C, 44.3; H, 3.1; N, 5.5%.)

Example 19

In the preparation of 4-benzoyloxy-N-dichloroacet-N-methylanilide 3 grams of dichloroacetyl chloride in 4 cc. of benzene is slowly added to a stirred mixture of 4 grams of 4-methylaminophenyl benzoate, 25 cc. of benzene, 25 cc. of water and 4 grams of sodium acetate. When addition is complete the reaction mixture is stirred for a further 10 minutes and the benzene layer is then separated and washed with 30 cc. of 2 N hydrochloric acid, 30 cc. of 5% sodium carbonate solution and 30 cc. of water. The washed benzene solution is dried over anhydrous magnesium sulphate and evaporated to dryness under reduced pressure. There is thus obtained 4-benzoyloxy-N-dichloroacet-N-methylanilide in the form of a crystalline solid which is identical to the product of Example 6.

4-methylaminophenyl benzoate which is employed in the above preparation is prepared in the following manner. A mixture of 100 grams of p-methylaminophenol sulphate, 200 cc. of formic acid and 4 grams of sodium formate is heated under reflux for 1 hour and then evaporated to dryness under reduced pressure. The residue is ground with water. The solid is isolated by filtration, dried in vacuo and recrystallised from benzene. There is thus obtained formo-4-hydroxy-N-methylanilide in the form of a crystalline solid which has a melting point of 105–106° C. (Found: N, 9.4. $C_8H_9O_2N$ requires N, 9.3%.) To a solution of 15.1 grams of formo-4-hydroxy-N-methylanilide in 75 cc. of 7% sodium hydroxide solution containing about 50 grams of ice is added 13 cc. of benzoyl chloride and the resulting mixture is shaken for 20 minutes. The precipitate which separates is isolated by filtration and recrystallised twice from alcohol. There is thus obtained 4-(formo-N-methylamido)phenyl benzoate in the form of a crystalline solid which has a melting point of 122–123° C. (Found: C, 70.2; H, 5.4; N, 5.3. $C_{15}H_{13}O_3N$ requires C, 70.6; H, 5.1; N, 5.5%.)

A mixture of 13.55 grams of 4-(formo-N-methylamido)phenyl benzoate and 100 cc. of N hydrochloric acid is heated under reflux until a clear solution is obtained. This solution is cooled and added to an excess of 5 N sodium hydroxide solution and the resulting precipitate is isolated by filtration, washed with 25 cc. of N sodium hydroxide solution and 50 cc. of water, dried in vacuo and recrystallised from alcohol. There is thus obtained 4-methylaminophenyl benzoate in the form of a crystalline solid which has a melting point of 125–126° C. (Found: C, 73.5; H, 5.7; N, 6.4. $C_{14}H_{13}O_2N$ requires C, 74.0; H, 5.7; N, 6.2%.)

Example 20

In the preparation of 4-benzoyloxy-N-dichloroacet-N-methylanilide a mixture of 4.54 grams of 4-methylaminophenyl benzoate, 3.5 grams of dichloroacetyl chloride and 20 cc. of benzene is heated under reflux until evolution of hydrogen chloride ceases. The resulting solution is washed with 30 cc. of water, 50 cc. of 5% sodium carbonate solution and 30 cc. of water, dried over anhydrous magnesium sulphate and evaporated to dryness under reduced pressure. There is thus obtained 4-benzoyloxy-N-dichloroacet-N-methylanilide in the form of a crystalline solid which is identical to the product of Examples 6 and 19.

Example 21

In the preparation of 4-(dichloroacet-N-methylamido)phenyl cinnamate, 17.3 grams of cinnamyl chloride are added slowly to a stirred solution of 23.4 grams of dichloroacet-4-hydroxy-N-methylanilide in 50 ml. of dry pyridine, water cooling being used to keep the temperature below 25° C. The reaction mixture is stirred for a further 40 minutes and then diluted with 400 ml. of ice-water containing 100 mg. of sodium hydrosulphite. The product is collected by filtration and recrystallised from 95% alcohol. There is thus obtained 4-(dichloracet-N-methylamido)phenyl cinnamate as a crystalline solid which has a melting point of 101–102° C. (Found: C, 59.55; H, 4.2. $C_{18}H_{15}Cl_2NO_3$ requires C, 59.35; H, 4.1%.)

In a similar manner are prepared the following esters:

4-(dichloroacet-N-methylamido)phenyl 4-methoxy-benzoate, M.P. 119–121° C. (Found: C, 55.8; H, 3.9. $C_{17}H_{15}Cl_2NO_4$ requires C, 55.4; H, 4.1%.)

4-(dichloroacet-N-methylamido)phenyl phthalate, M.P. 137–138° C. (Found: C, 52.5; H, 3.4. $C_{26}H_{20}Cl_4N_2O_6$ requires C, 52.2; H, 3.3%.)

4-(dichloroacet-N-methylamido)phenyl 3-phenyl-propionate, M.P. 76–77° C. (Found: C, 58.9; H, 4.6. $C_{18}H_{17}Cl_2NO_3$ requires C, 59.0; H, 4.6%.)

4-(dichloroacet-N-methylamido)phenyl 2 - acetyl-salicylate, M.P. 175–177° C. (Found: C, 55.1; H, 3.9. $C_{18}H_{15}Cl_2NO_5$ requires C, 54.6; H, 3.8%.)

4 - (dichloroacet - N - methylamido)phenyl hexahydrobenzoate, M.P. 76–78.5° C. (Found: C, 56.0; H, 5.7. $C_{16}H_{19}Cl_2NO_3$ requires C, 55.8; H, 5.5%.)

4-(dichloroacet - N - methylamido)phenyl octanoate, M.P. 42–44° C. (Found: C, 56.7; H, 6.3. $C_{17}H_{23}Cl_2NO_3$ requires C, 56.7; H, 6.4%.)

4 - (dichloroacet - N - methylamido)phenyl alpha-naphthoate, M.P. 140–141° C. (Found: C, 61.6; H, 4.0. $C_{20}H_{15}Cl_2NO_3$ requires C, 61.8; H, 3.9%.)

4-(dichloroacet-N-methylamido)phenyl p-toluate, M.P. 102.5–105° C. (Found: C, 58.0; H, 4.3. $C_{17}H_{15}Cl_2NO_3$ requires C, 58.0; H, 4.3%.)

4-(dichloroacet-N-methylamido)phenyl 4 - nitrobenzoate, M.P. 145–147° C. (Found: C, 49.9; H, 3.1. $C_{16}H_{12}Cl_2N_2O_5$ requires C, 50.2; H, 3.1%.)

4-(dichloroacet-N-methylamido)phenyl 3:4-dimethoxybenzoate, M.P. 156° C. (Found: C, 54.3; H, 4.3. $C_{18}H_{17}Cl_2NO_5$ requires C, 54.3; H, 4.3%.)

4-(dichloroacet-N-methylamido)phenyl 2-chlorobenzoate, M.P. 108–110° C. (Found: C, 51.2; H, 3.3. $C_{16}H_{12}Cl_3NO_3$ requires C, 51.6; H, 3.2%.)

4-(dichloroacet-N-methylamido)phenyl 3-methoxybenzoate, M.P. 113–114° C. (Found: C, 55.6; H, 4.0. $C_{17}H_{15}Cl_2NO_4$ requires C, 55.4; H, 4.1%.)

4-(dichloroacet-N-methylamido)phenyl hippurate, M.P. 146–148° C. (Found: C, 54.8; H, 4.0. $C_{18}H_{16}Cl_2N_2O_4$ requires C, 54.7; H, 4.05%.)

*Example 22*

Following a similar reaction procedure to that described in Example 21, but employing an isolation procedure comprising the steps of dissolving the crude, non-crystalline product in chloroform, washing the chloroform solution with half-normal sulphuric acid, aqueous sodium bicarbonate solution and water, drying the solution with anhydrous magnesium sulphate, removing the chloroform by distillation and crystallising the residue from 95% alcohol, there are obtained the following as crystalline solids:

4-(dichloroacet-N-methylamido)phenyl sebacate, M.P. 82–83° C. (Found: C, 53.2; H, 5.0. $C_{23}H_{32}Cl_4N_2O_6$ requires C, 53.0; H, 5.05%.)

4-(dichloroacet - N - methylamido)phenyl diphenylacetate, M.P. 99–101° C. (Found: C, 64.2; H, 4.6. $C_{23}H_{19}Cl_2NO_3$ requires C, 64.5; H, 4.4.)

4-(dichloroacet-N-methylamido)phenyl o-benzoylbenzoate, M.P. 115–116° C. (Found: C, 62.2; H, 4.0. $C_{23}H_{17}Cl_2NO_4$ requires C, 62.4; H, 3.8%.)

*Example 23*

By the method described in Example 22, but using ether in place of chloroform, there is obtained 4-(dichloroacet-N-methylamido)phenyl oleate in the form of an oil. (Found: C, 64.5; H, 8.3. $C_{27}H_{41}Cl_2NO_3$ requires C, 65.1; H, 8.2%.)

*Example 24*

By the method described in Example 21, but additionally crystallising the product from methyl propyl ketone, there is obtained 4-(dichloroacet-N-methylamido)phenyl terephthalate as a crystalline solid which has a melting point of 174–177° C. (Found: C, 52.0; H, 3.6. $C_{26}H_{20}Cl_4N_2O_6$ requires C, 52.2; H, 3.3%.)

*Example 25*

By the method described in Example 21, but employing a reaction temperature of less than 10° C., and crystallising the products from methanol, there are obtained as crystalline solids the following:

4-(dichloroacet-N-methylamido)phenyl laurate, M.P. 52–54° C. (Found: C, 60.5; H, 7.4. $C_{21}H_{31}Cl_2NO_3$ requires C, 60.6; H, 7.5%.)

4-(dichloroacet-N-methylamido)phenyl stearate, M.P. 65–68° C. (Found: C, 65.7; H, 8.9; N, 3.0. $C_{27}H_{43}Cl_2NO_3$ requires C, 64.8; H, 8.6; N, 2.8%.)

*Example 26*

In the preparation of 4-(dichloroacet-N-methylamido)phenyl 4 - methanesulphonylbenzoate, 22.0 grams of 4-methanesulphonylbenzoyl chloride are added over ten minutes to a stirred solution of 21.5 g. of dichloroacet-4-hydroxy-N-methylanilide in 90 ml. of dry pyridine. At the end of this time the mixture is warmed to 40° C. and stirred at this temperature for one hour. The product is then isolated as described in Example 1, giving 4-(dichloroacet - N-methylamido)phenyl 4-methanesulphonylbenzoate in the form of a crystalline solid with a melting point of 166–168° C. when crystallised from benzene. (Found: C, 49.4; H, 3.7. $C_{17}H_{15}Cl_2NO_5S$ requires C, 49.0; H, 3.6%.)

*Example 27*

In the preparation of 4-(dichloroacet-N-methylamido)-phenyl 4-chlorobenzoate a mixture of 5.9 grams of 4-chlorobenzoic anhydride, 4.7 grams of dichloroacet-4-hydroxy-N-methylanilide and 20 ml. of dry pyridine is kept at 20° C. for 3 hours and then warmed to 85° C. for 30 minutes, cooled and poured into 200 ml. of ice-water. The product is collected by filtration and recrystallised from alcohol. There is thus obtained 4-(dichloroacet-N-methylamido)phenyl 4-chlorobenzoate as a crystalline solid with a melting point of 98.5–100° C. (Found: C, 51.4; H, 3.3. $C_{16}H_{12}Cl_3NO_3$ requires C, 51.6; H, 3.2%.)

*Example 28*

In the preparation of 4-(dichloroacet-N-methylamido)-phenyl 4-chlorobenzoate an intimate mixture of 5.9 grams of 4-chlorobenzoic anhydride and 4.7 grams of dichloroacet-4 hydroxy-N-methylanilide is heated in an oil bath at 130–170° C. for 3 hours. The cooled mixture is then crystallised from alcohol and ground in a mortar with 30 ml. of N sodium hydroxide solution and the solid is collected and recrystallised from alcohol to give 4-dichloroacet-N-methylamido)phenyl 4 - chlorobenzoate, identical with that prepared as described in Example 27.

*Example 29*

In the preparation of 4-(dichloroacet-N-methylamido)-phenyl alpha-methoxyproprionate, 11.7 grams of dichloroacet-4-hydroxy-N-methylanilide are added portionwise to a solution of 6.2 grams of alpha-methoxypropionyl chloride in 50 ml. of dry pyridine and the mixture is maintained at room temperature for 20 hours. The mixture is quenched by pouring into 500 ml. of water and the product is collected by filtration, washed with dilute sulphuric acid and water and crystallised from methanol. There is thus obtained 4-(dichloroacet-N-methylamido)-phenyl alpha-methoxypropionate as a crystalline solid with a melting point of 110–111° C. (Found: C, 48.9; H, 4.4. $C_{13}H_{15}Cl_2NO_4$ requires C, 48.8; H, 4.7%.)

*Example 30*

In the preparation of 4-(dichloroacet-N-methylamido)phenyl O-methylmandelate, 8.1 grams of dichloroacet-4-hydroxy-N-methylanilide is added portionwise to a solution of 6.4 grams of O-methylmandelyl chloride in 32 ml. of dry pyridine and the mixture is maintained at room temperature for 20 hours and is quenched by pouring into 500 ml. of water. The gummy product is extracted with three 100 ml. portions of ether and the combined ethereal extracts are washed successively with 5 N sulphuric acid, water, 2 N sodium hydroxide and water. The solution is dried with anhydrous sodium sulphate and evaporated to give a gummy product which is crystallised twice from aqueous methanol. There is thus obtained 4-(dichloroacet-N-methylamido)phenyl O-methylmandelate as a crystalline solid with a melting point of 86–88° C. (Found: C, 56.7; H, 4.7. $C_{18}H_{17}Cl_2NO_4$ requires C, 56.55; H, 4.55%.)

This application is a continuation-in-part of application Serial No. 618,702, filed October 29, 1956, now abandoned.

We claim:

1. A compound of the formula

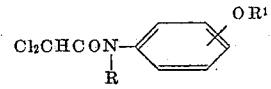

wherein R represents a lower alkyl radical and $R^1$ represents a radical selected from the group consisting of $HOSO_2$— and the non-toxic alkali metal, alkaline earth metal, ammonium and amine salts thereof; $(HO)_2PO$— and the non-toxic alkali metal, alkaline earth metal, ammonium and amine salts thereof

wherein $R^2$ represents a radical selected from the group consisting of alkyl of up to 17 carbon atoms, alkenyl of up to 17 carbon atoms, phenyl, naphthyl, phenyl lower alkyl, phenyl lower alkenyl, and cycloaliphatic of up to six carbon atoms, their substitution products with at least one substituent selected from the group consisting of halo, nitro, lower alkyl and lower alkoxy substituents, and $R^3COOR^4$ wherein $R^3$ represents a radical selected from the group consisting of lower alkylene, phenylene, cyclohexylene radicals, their substitution products with at least one substituent selected from the group consisting of halo, nitro, lower alkyl and lower alkoxy substituents, and $R^4$ represents the [dichloroacet-N-(lower alkyl)-amido] phenyl radical.

2. Piperazinium 4 - (dichloroacet-N-methylamido)-phenyl sulphate.

3. 4-benzoyloxy-N-dichloroacet-N-methylanilide.

4. A compound of the formula

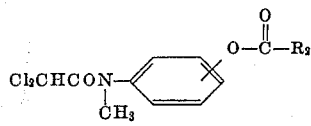

wherein $R_2$ is an alkyl of up to 17 carbon atoms.

5. A compound of the formula

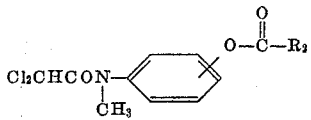

wherein $R_2$ is naphthyl.

References Cited in the file of this patent

UNITED STATES PATENTS

| | | |
|---|---|---|
| 1,915,039 | Urbain | June 20, 1933 |
| 2,141,172 | Christiansen | Dec. 27, 1938 |
| 2,752,393 | Martin | June 26, 1956 |